(12) United States Patent
Murata et al.

(10) Patent No.: US 9,112,206 B2
(45) Date of Patent: Aug. 18, 2015

(54) ELECTRIC STORAGE APPARATUS

(75) Inventors: Takashi Murata, Toyota (JP);
Takamasa Suzuki, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 811 days.

(21) Appl. No.: 13/499,630

(22) PCT Filed: Nov. 1, 2010

(86) PCT No.: PCT/JP2010/006433
§ 371 (c)(1),
(2), (4) Date: Mar. 30, 2012

(87) PCT Pub. No.: WO2012/059951
PCT Pub. Date: May 10, 2012

(65) Prior Publication Data
US 2012/0208064 A1  Aug. 16, 2012

(51) Int. Cl.
| | |
|---|---|
| *H01M 10/50* | (2006.01) |
| *H01M 2/10* | (2006.01) |
| *H01M 10/625* | (2014.01) |
| *H01M 10/647* | (2014.01) |
| *H01M 10/6551* | (2014.01) |
| *H01M 10/6555* | (2014.01) |
| *H01M 10/613* | (2014.01) |

(52) U.S. Cl.
CPC .......... *H01M 2/1077* (2013.01); *H01M 2/1083* (2013.01); *H01M 10/613* (2015.04); *H01M 10/625* (2015.04); *H01M 10/647* (2015.04); *H01M 10/6551* (2015.04); *H01M 10/6555* (2015.04)

(58) Field of Classification Search
CPC .......................... H01M 10/50; H01M 10/5059
USPC ......................................... 429/120, 148, 152
See application file for complete search history.

(56) References Cited

U.S. PATENT DOCUMENTS

| | | | |
|---|---|---|---|
| 5,492,779 A * | 2/1996 | Ronning | 429/120 |
| 6,033,800 A | 3/2000 | Ichiyanagi et al. | |
| 8,377,582 B2 * | 2/2013 | Eom | 429/120 |
| 2006/0063067 A1 | 3/2006 | Kim | |

FOREIGN PATENT DOCUMENTS

| | | |
|---|---|---|
| JP | 09-199094 A | 7/1997 |
| JP | 2000-048867 A | 2/2000 |
| JP | 2001-110385 A | 4/2001 |
| JP | 2005-340091 A | 12/2005 |
| JP | 2006-093144 A | 4/2006 |
| JP | 2006-310309 A | 11/2006 |

(Continued)

*Primary Examiner* — Tracy Dove
(74) *Attorney, Agent, or Firm* — Sughrue Mion, PLLC

(57) ABSTRACT

An electric storage apparatus has a plurality of electric storage units placed in line in a first direction, and a spacer forming space between two adjacent ones of the electric storage units, a heat exchange medium for use in temperature adjustment of the electric storage unit being moved in the space in a second direction orthogonal to the first direction. The spacer has a protruding portion on each of two faces forming the space and opposite to each other, the protruding portion protruding toward the inside of the space. The protruding portions provided on the two respective faces are shifted in the second direction from positions where the protruding portions are opposite to each other in the first direction.

7 Claims, 9 Drawing Sheets

(56) References Cited

FOREIGN PATENT DOCUMENTS

| JP | 2007-200778 A | 8/2007 |
| JP | 2007-250515 A | 9/2007 |
| JP | 2009-016285 A | 1/2009 |
| JP | 2010-238551 A | 10/2010 |

* cited by examiner

ELECTRIC STORAGE APPARATUS

TECHNICAL FIELD

The present invention relates to an electric storage apparatus including a plurality of electric storage units placed in line in one direction.

BACKGROUND ART

A plurality of cells can be connected electrically to each other to constitute an assembled battery. Specifically, the plurality of cells are placed in line in one direction to constitute the assembled battery.

Since the cell produces heat due to charge and discharge or the like, a temperature rise in the cell is suppressed by bringing air for cooling into contact with the cell. In the configuration in which the plurality of cells are placed in line in one direction, space is formed between two adjacent ones of the cells. The air for cooling is guided to the space to cool the cells.

PRIOR ART DOCUMENTS

Patent Documents

[Patent Document 1] Japanese Patent Laid-Open No. 2006-093144
[Patent Document 2] Japanese Patent Laid-Open No. 2001-110385
[Patent Document 3] Japanese Patent Laid-Open No. 2006-310309
[Patent Document 4] Japanese Patent Laid-Open No. 2009-016285

SUMMARY OF THE INVENTION

Problems to be Solved by the Invention

Only the air guided to the space formed between the two adjacent cells can not provide sufficient cooling efficiency for the cells.

It is an object of the present invention to provide an electric storage apparatus achieving improved efficiency in adjusting the temperature of electric storage units.

Means for Solving the Problems

An electric storage apparatus according to the present invention includes a plurality of electric storage units placed in line in a first direction, and a spacer forming space between two adjacent ones of the electric storage units, a heat exchange medium for use in temperature adjustment of the electric storage unit being moved in the space in a second direction orthogonal to the first direction. The spacer has a protruding portion on each of two faces forming the space and opposite to each other, the protruding portion protruding toward the inside of the space. The protruding portions provided on the two respective faces are shifted in the second direction from positions where the protruding portions are opposite to each other in the first direction.

The spacer can be formed of a plurality of ribs for forming the space. For example, each of two adjacent electric storage units can be provided with such ribs, and the ribs of one of the electric storage units can be brought into contact with the ribs of the other of the electric storage units, thereby forming the space in which the heat exchange medium moves. The protruding portion can be placed between two adjacent ones of the ribs.

The protruding portion can be connected to two adjacent ones of the ribs. When the protruding portion is connected to the two ribs in this manner, the protruding portions can be located in the entire space formed by the two ribs to produce turbulence in the flow of the heat exchange medium in the entire space.

The protruding portion can be inclined with respect to the second direction. This enables smooth movement of the heat exchange medium within the space. The protruding portions provided on the two respective faces opposite to each other are inclined in directions in which the protruding portions approach each other when viewed from the first direction. This can produce a twist in the flow of the heat exchange medium within the space to achieve efficient heat exchange between the heat exchange medium and the electric storage units.

The electric storage unit has a positive electrode terminal and a negative electrode terminal. The protruding portion provided in a region closer to the positive electrode terminal than a boundary line located at a midpoint between the positive electrode terminal and the negative electrode terminal can be shifted in the second direction from the protruding portion provided in a region closer to the negative electrode terminal than the boundary line. When the electric storage units are place in line in the first direction, the positive electrode terminal and the negative electrode terminal can be placed alternately in the first direction. In this case, the plurality of electric storage units are placed in line in the first direction in reverse orientations such that the positions of the positive electrode terminal and the negative electrode terminal are changed.

Since the protruding portion provided in the region closer to the positive electrode terminal is shifted in the second direction from the protruding portion provided in the region closer to the negative electrode terminal, only the in-line placement of the plurality of electric storage units in the reverse orientations allows the protruding portions provided on the two respective face opposite to each other to be shifted from each other in the second direction.

The spacer can be formed integrally with an outer face of the electric storage unit. A pair of end plates holding the plurality of electric storage units sandwiched in the first direction, and a coupling member extending in the first direction and having both ends connected to the pair of end plates can be provided. This can apply a restraint force to the plurality of electric storage units.

Effect of the Invention

According to the present invention, the protruding portions shifted from each other in the second direction (moving direction of air) are provided on the two opposite faces forming the space to produce turbulence easily in the flow of the heat exchange medium within the space. This can improve the efficiency of heat exchange between the heat exchange medium and the electric storage units to facilitate the adjustment of the temperature of the electric storage units.

MODE FOR CARRYING OUT THE INVENTION

An embodiment of the present invention will hereinafter be described.

Embodiment 1

Figure 1:
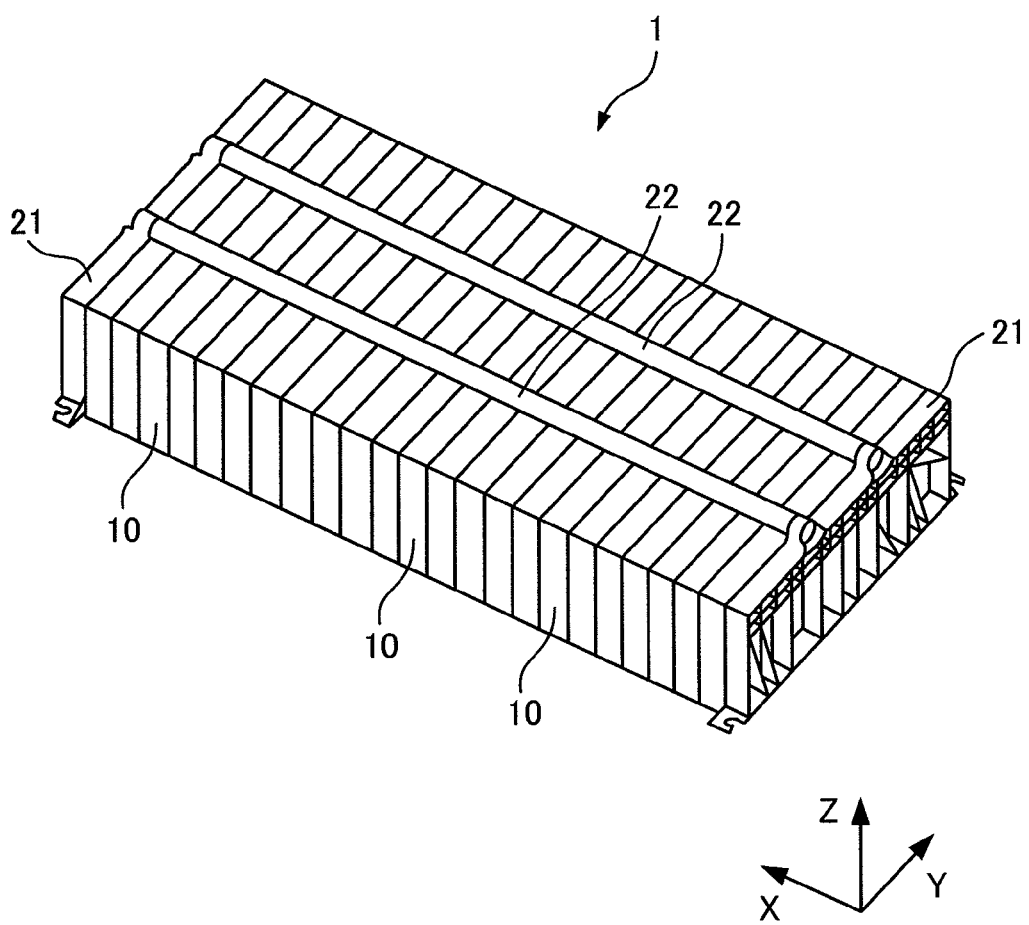
FIG. 1 is an external view of a battery pack which is Embodiment 1.

A battery pack (corresponding to a electric storage apparatus) which is Embodiment 1 of the present invention will be described with reference to FIG. 1. FIG. 1 is an external view of the battery pack which is the present embodiment. In FIG. 1, an X axis, a Y axis, and a Z axis are axes orthogonal to each other. In the present embodiment, the axis corresponding to a vertical direction is defined as the Z axis.

The battery pack 1 of the present embodiment can be mounted on a vehicle. Examples of the vehicle include a hybrid vehicle and an electric vehicle. The hybrid vehicle is a vehicle which includes a fuel cell or an internal-combustion engine in addition to the battery pack 1 as a power source for running of the vehicle. The electric vehicle is a vehicle which includes only the battery pack 1 as the power source. When a motor generator is used to convert kinetic energy produced in braking of the vehicle into electric energy, the electric energy can be stored in the battery pack 1. For mounting the battery pack 1 onto the vehicle or the like, a pack case for surrounding the battery pack 1 is used.

Figure 2:
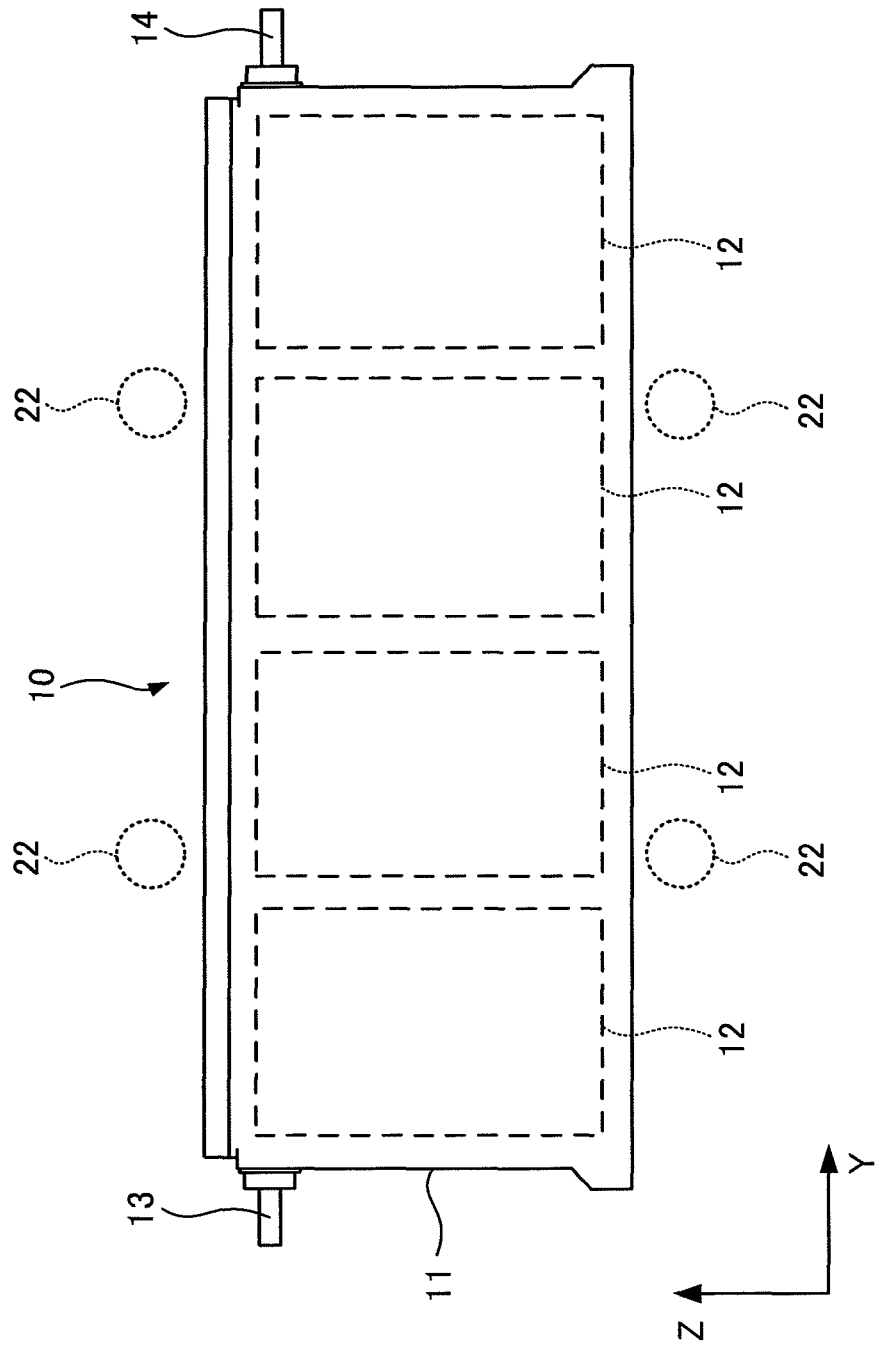
FIG. 2 is a schematic diagram showing the internal structure of a battery module in Embodiment 1.

The battery pack 1 has a plurality of battery modules (corresponding to electric storage units) 10 placed in line in the X direction (corresponding to a first direction). As shown in FIG. 2, one battery module 10 has a module case 11 and four cells 12 housed in the module case 11. The four cells 12 housed in the module case 11 are connected electrically in series. The module case 11 can be formed of resin, for example.

A secondary battery such as a nickel metal hydride battery or a lithium-ion battery can be used as each cell 12. Instead of the secondary battery, an electric double layer capacitor (capacitor) can be used. The number of the cells 12 housed in the module case 11 is not limited to four but can be set as appropriate. While the plurality of battery modules 10 are placed in line in the X direction in the present embodiment, the present invention is not limited thereto. Specifically, a plurality of cells can be placed in line in the X direction to constitute the battery pack 1. In this case, the cell corresponds to the electric storage unit in the present invention.

A pair of end plates 21 are placed at both ends of the battery pack 1 in the X direction. A restraint rod (corresponding to a coupling member) 22 extending in the X direction is connected to the pair of end plates 21. Both ends of the restraint rod 22 can be fixed to the pair of end plates 21 to provide a restraint force for the plurality of battery modules 10. The restraint force refers to a force acting to hold the battery modules 10 sandwiched in the X direction.

In the present embodiment, the two restraint rods 22 are placed on an upper face of the battery pack 1, and the two restraint rods 22 are also placed on a lower face of the battery pack 1 (see FIG. 2). The number and the section shape of the restraint rods 22 can be set as appropriate. The section shape of the restraint rod 22 refers to a shape in a section orthogonal to a longitudinal direction of the restraint rod 22. It is required only that the restraint rod 22 can produce the restraint force through the connection to the pair of end plates 21.

A positive electrode terminal 13 and a negative electrode terminal 14 are provided at side faces of the module case 11 in the Y direction. The positive electrode terminal 13 is connected to a positive electrode of the cell 12 housed in the module case 11, and the negative electrode terminal 14 is connected to a negative electrode of the cell 12 housed in the module case 11. The positive electrode terminal 13 and the negative electrode terminal 14 can be used to perform charge and discharge of the battery module 10.

In the two adjacent battery modules 10 in the X direction, the positive electrode terminal 13 of one of those battery modules 10 is connected electrically to the negative electrode terminal 14 of the other of the battery modules 10 through a bus bar. The plurality of battery modules 10 placed in line in the X direction are connected electrically in series through the bus bar.

In the present embodiment, a bus bar module is placed at each end of the battery module 10 in the Y direction. The bus bar module has a plurality of bus bars and a plate supporting these bus bars. The plate can be formed of an insulating material such as resin. The use of the bus bar module allows the plurality of bus bars to be attached easily to the plurality of battery modules 10.

While all of the battery modules 10 are connected electrically in series in the present embodiment, the present invention is not limited thereto. Specifically, a plurality of battery modules 10 connected electrically in parallel can be included.

Figure 3:
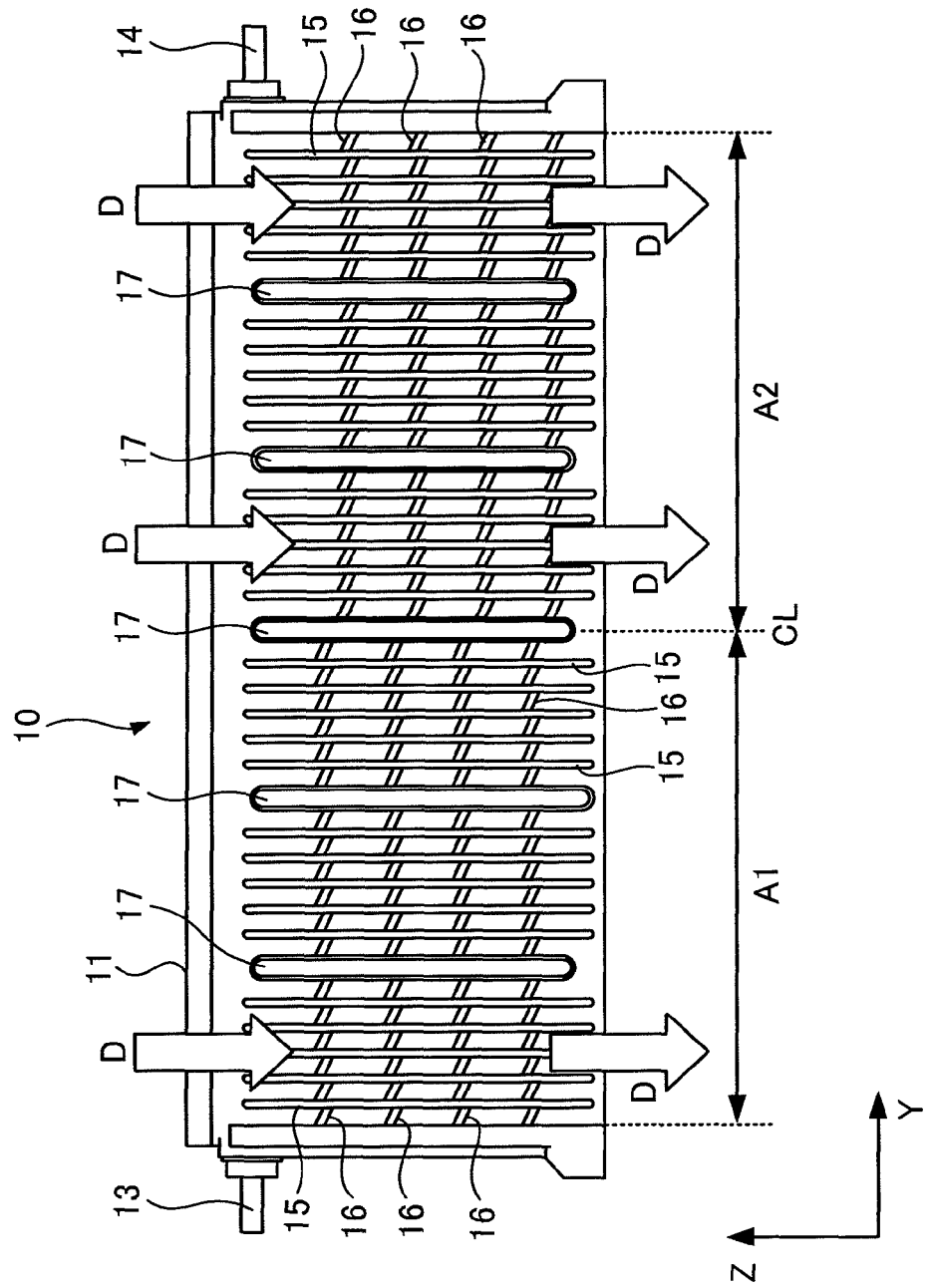
FIG. 3 is an external view of the battery module in Embodiment 1.

As shown in FIG. 3, first ribs 15, protruding portions 16, and second ribs 17 are formed at each of side faces of the battery module 10 in the X direction. The face on which the first ribs 15, the protruding portions 16, and the second ribs 17 are provided is a face opposite to another one of the battery modules 10. While FIG. 3 shows one face of the battery modules 10, the other face has a similar configuration.

Figure 4:
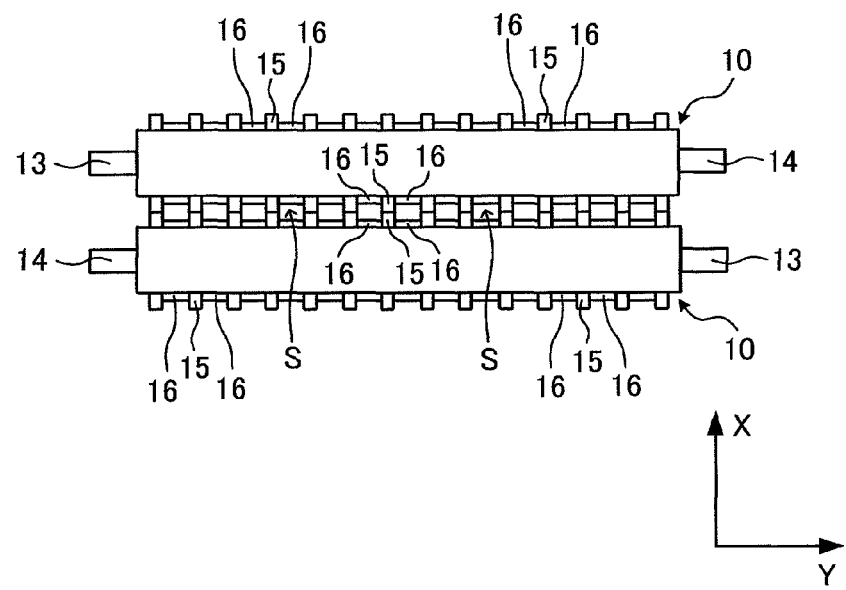
FIG. 4 is a diagram showing the configuration in which two battery modules are placed in line in Embodiment 1.

The first rib 15 protrudes in the X direction from an outer face of the module case 11 and extends in the Z direction. The plurality of first ribs 15 are placed in line in the Y direction. When the two battery modules are placed in line in the X direction, the first ribs 15 in the respective battery modules 10 are in contact with each other as shown in FIG. 4. Specifically, the extreme ends of the first ribs 15 in the X direction are in contact with each other. Since the restraint force is applied to the battery modules 10, the two first ribs 15 opposite to each other in the X direction are in close contact.

When the two first ribs 15 opposite to each other in the X direction are in contact with each other, space S is formed between the two battery modules 10. The space S refers to space surrounded by the two first ribs 15 opposite in the X direction and the two first ribs 15 opposite in the Y direction. The space S serves as space through which air for adjusting the temperature of the battery module 10 (corresponding to a heat exchange medium) moves. The air introduced into the space S moves in the Z direction (corresponding to a second direction). The first rib 15 is used for forming the path through which the air for temperature adjustment is moved.

The second rib 17 protrudes in the X direction from the outer face of the module case 11 and extends in the Z direction. The second rib 17 has the function similar to that of the first rib 15. The width of the second rib 17 in the Y direction is larger than the width of the first rib 15 in the Y direction. The length of the second rib 17 in the Z direction is larger than the length of the first rib 15 in the Z direction. The provision of the second ribs 17 can ensure the strength of the ribs. The shape and the number of the second ribs 17 can be set as appropriate. While the second ribs 17 are provided in the present embodiment, the second ribs 17 can be omitted.

The first ribs 15 and the second ribs 17 are placed at equal intervals in the Y direction. Alternatively, the first ribs 15 and the second ribs 17 can not be placed at equal intervals in the Y direction. The placement of the first ribs 15 and the second ribs 17 at equal intervals can smoothly move the air on the surface of the battery module 10.

When the battery module 10 produces heat due to charge and discharge, air for cooling can be brought into contact with the battery module 10 to suppress a temperature rise in the battery module 10. When the battery module 10 is excessively cooled, air for heating can be brought into contact with the battery module 10 to suppress a temperature drop in the battery module 10. The temperature adjustment in the battery module 10 can suppress deterioration of input/output characteristics of the battery module 10.

When the battery pack 1 is mounted on the vehicle, air in the interior of the vehicle can be supplied to the battery pack 1. The vehicle interior refers to space where a passenger rides. The temperature of the air in the vehicle interior can be a temperature suitable for the temperature adjustment of the battery pack 1 due to the use of an air conditioner or the like. Thus, the supply of the air in the vehicle interior to the battery pack 1 can adjust the temperature of the battery pack 1. The air is not limited to the air in the vehicle interior, and air outside the vehicle can be supplied to the battery pack 1. Alternatively, gas (corresponding to the heat exchange medium) or liquid (corresponding to the heat exchange medium) can be brought into contact with the battery module 10 instead of air to adjust the temperature of the battery module 10.

As shown by arrows D in FIG. 3, the air is moved from an upper face toward a lower face of the battery module 10 in the present embodiment. Specifically, an intake path can be provided on the upper face of the battery pack 1 to guide the air for temperature adjustment to the space S. A discharge path can be provided on the lower face of the battery pack 1 to guide the air from the space S to the discharge path.

The battery pack 1 is housed in the pack case to allow the intake path and the discharge path to be provided on the upper face and the lower face of the battery pack 1, respectively. While the air is moved from the upper face toward the lower face of the battery module 10 in the present embodiment, the present invention is not limited thereto. For example, the air can be moved from the lower face toward the upper face of the battery module 10.

The four protruding portions 16 are provided between the two first ribs 15 adjacent in the Y direction. The four protruding portions 16 are placed in line in the Z direction. For those protruding portions 16 provided between the two first ribs 15 adjacent in the Y direction, the number of the protruding portions 16 and the interval between the protruding portions 16 in the Z direction can be set as appropriate. While the four protruding portions 16 are placed at equal intervals in the Z direction in the present embodiment, the present invention is not limited thereto. For example, three or more protruding portions 16 can be placed at different intervals in the Z direction.

The protruding portion 16 is linked to the two first ribs 15 adjacent in the Y direction. Some of the protruding portions 16 are linked to the first rib 15 and the second rib 17 adjacent in the Y direction. Alternatively, the protruding portion 16 can be separated from at least one of the two first ribs 15 adjacent in the Y direction. Similarly, the protruding portion 16 can be separated from at least one of the first rib 15 and second rib 17 adjacent in the Y direction.

The protruding portion 16 is inclined with respect to the direction in which the first rib 15 extends (Z direction) in a Y-Z plane. The protruding portion 16 can extend in the direction orthogonal to the first rib 15 (Y direction). However, as shown in FIG. 5, the protruding portion 16 preferably has an inclination angle (acute angle) $\theta$ of 30 degrees or smaller and zero degrees or larger with respect to a horizontal plane (X-Y plane).

When the inclination angle $\theta$ of the protruding portion 16 falls within the range from 0 to 30 degrees, the air can be caused to strike the protruding portion 16 to produce turbulence easily in the air flow, as later described. On the other hand, if the inclination angle $\theta$ of the protruding portion 16 is larger than 30 degrees, it is difficult to produce turbulence in the air flow.

As shown in FIG. 3, the positions of the protruding portions 16 in a region A1 of the battery module 10 are different from those in a region A2. The regions A1 and A2 refer to regions provided by dividing the side face of the battery module 10 into two in the Y direction by a boundary line CL extending in the Z direction. The regions A1 and A2 have the same area.

Figure 5:
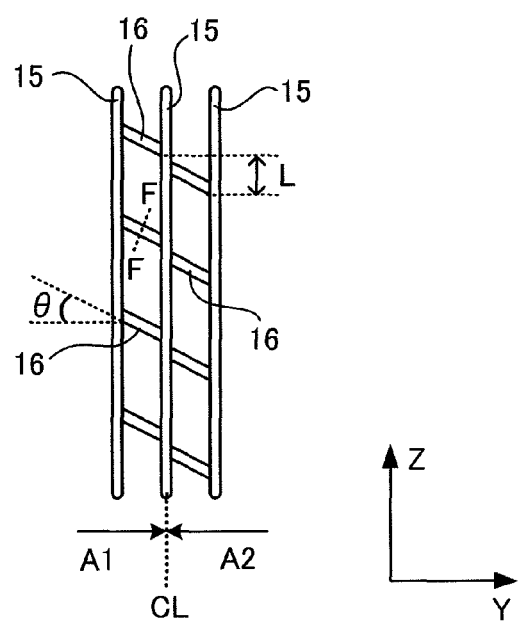
FIG. 5 is a schematic diagram showing the configuration of first ribs and protruding portions in Embodiment 1.

As shown in FIG. 5, the protruding portion 16 formed in the region A1 is shifted upward from the protruding portion 16 formed in the region A2. A distance L indicates the shift amount of the protruding portion 16 in the region A1 from the protruding portion 16 in the region A2. The shift amount L can be set as appropriate.

As shown in FIG. 4, the protruding amount of the protruding portion 16 in the X direction is smaller than the protruding amount of the first rib 15 in the X direction. Thus, the air introduced into the space S moves in the space where the protruding portion 16 is not formed while the air passes through the space S. The protruding amount of the protruding portion 16 is preferably larger than 22% of the protruding amount of the first rib 15 and is 87% or smaller than the protruding amount of the first rib 15. When the protruding amount of the protruding portion 16 is determined within that numeric value range, the air can be moved efficiently in the space S.

If the protruding amount of the protruding portion 16 is 22% or smaller of the protruding amount of the first rib 15, the air does not easily strike the protruding portion 16, and turbulence of air is difficult to produce in the space S, as later described. If the protruding amount of the protruding portion 16 is larger than 87% of the protruding amount of the first rib 15, the movement of the air is readily obstructed by the protruding portion 16.

Figure 6:
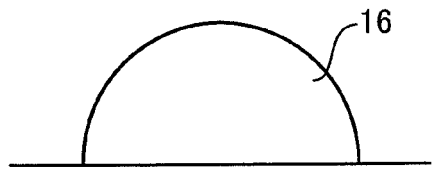
FIG. 6 is a section view of the protruding portion in Embodiment 1.

FIG. 6 shows the section of the protruding portion 16. Specifically, FIG. 6 is a diagram of the protruding portion 16 cut along line F-F in FIG. 5. The line F-F is orthogonal to a longitudinal direction of the protruding portion 16. As shown in FIG. 6, the protruding portion 16 is formed in a semicircular shape, and the outer face of the protruding portion 16 has a curvature. While the section shape of the protruding portion 16 is formed in the shape shown in FIG. 6 in the present embodiment, the present invention is not limited thereto.

Figure 7:
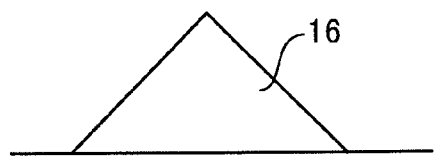
FIG. 7 is a section view of the protruding portion in a modification of Embodiment 1.
Figure 8:
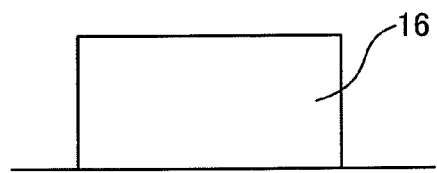
FIG. 8 is a section view of the protruding portion in another modification of Embodiment 1.

The section shape of the protruding portion 16 can be set as appropriate, and for example, can be formed in shapes as shown in FIG. 7 and FIG. 8. FIG. 7 and FIG. 8 are diagrams corresponding to FIG. 6 and show the shapes of the protruding portion 16 in the section orthogonal to the longitudinal direction thereof. In a modification shown in FIG. 7, the section of the protruding portion 16 is formed in a triangular shape. In the modification shown in FIG. 8, the section of the protruding portion 16 is formed in a rectangular shape. The outer face of the protruding portion 16 formed of a curved face as in the present embodiment facilitates the smooth movement of the air in the space S.

Figure 9:
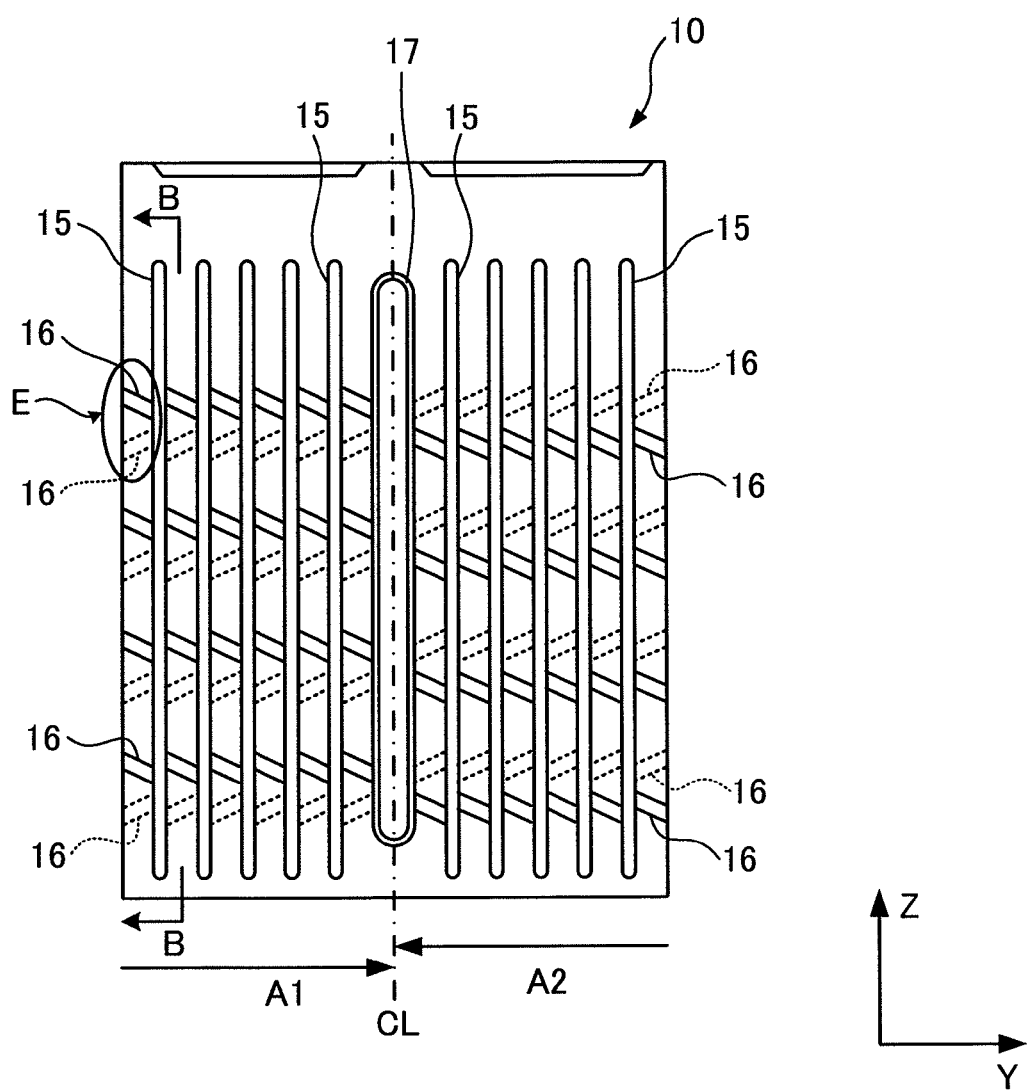
FIG. 9 is a side view showing part of the battery module in Embodiment 1.

Description will be made of the relationship between the protruding portion 16 of one of the two battery modules 10 and the protruding portion 16 of the other battery module 10 when the two battery modules 10 are placed in line in the X direction with reference to FIG. 9. FIG. 9 shows the side face of the one battery module 10 in solid lines and shows only the protruding portion 16 of the other battery module 10 in dotted lines. The other battery module 10 is placed toward the reader relative to the one battery module 10 shown in FIG. 9.

In the present embodiment, the protruding portions 16 within the region A1 is shifted in the Z direction from the protruding portions 16 within the region A2 in the one battery module 10. In placing the plurality of battery modules 10 in line in the X direction, the battery modules 10 are arranged in reverse orientations such that the positive electrode terminals 13 and the negative electrode terminals 14 are alternately placed in line in the X direction. When the battery modules 10 are placed in the reverse orientations, the region A1 of one of the two battery modules 10 adjacent in the X direction and the region A2 of the other battery module 10 are opposite to each other in the X direction.

Figure 10:
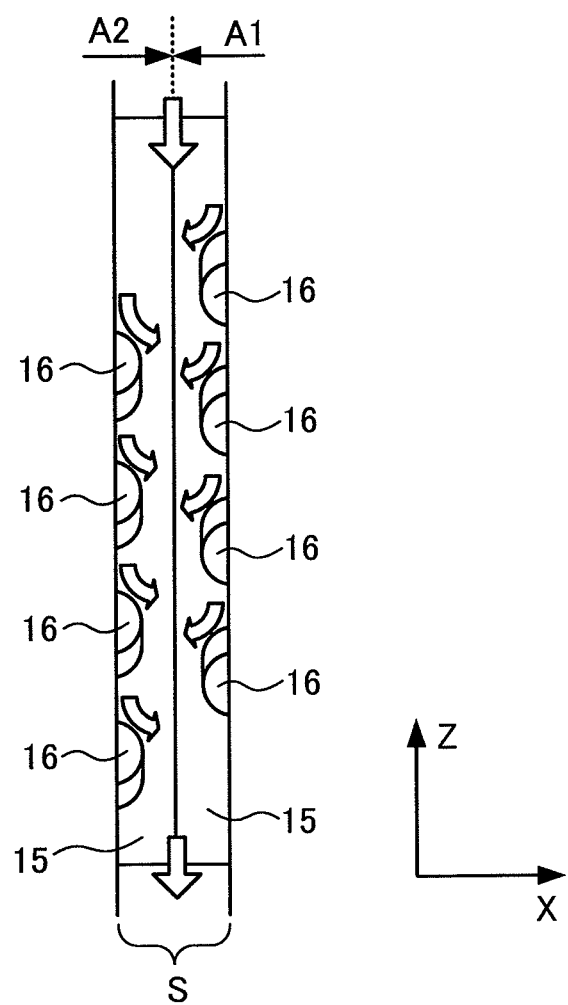
FIG. 10 is a section view taken along B-B line in FIG. 9.

Thus, the plurality of protruding portions 16 are placed in the space S where the air moves as shown in FIG. 10. FIG. 10 is a section view taken along line B-B in FIG. 9. The protruding portions 16 provided on the right side in FIG. 10 are the protruding portions 16 shown by the solid lines in FIG. 9, and are the protruding portions 16 located within the region A1 of the one battery module 10. The protruding portions 16 provided on the left side in FIG. 10 are the protruding portions 16 shown by the dotted lines in FIG. 9, and are the protruding portions 16 located within the region A2 of the other battery module 10. As described above, the protruding portion 16 within the region A1 is shifted from the protruding portion 16 within the region A2 in the Z direction.

In FIG. 9, the inclination direction of the protruding portion 16 shown by the solid line is different from the inclination direction of the protruding portion 16 shown by the dotted line. Specifically, the left end of the protruding portion 16 shown by the solid line is located above the right end in the state shown in FIG. 9. The left end of the protruding portion 16 shown by the dotted line is located below the right end. When attention is focused on the two protruding portions 16 within a region E shown in FIG. 9 (the protruding portions 16 shown by the solid line and the dotted line), the two protruding portions 16 are inclined in the directions in which they move away from each other. In other words, the two protruding portions 16 are inclined in the directions in which they approach each other.

When the air enters the space S, the air strikes the protruding portions 16 while moving in the space S. Arrows in FIG. 10 indicate the moving directions of the air (by way of example). The air can be caused to strike the protruding portions 16 in this manner to produce turbulence in the air flow. The production of turbulence in the air flow can promote heat exchange between the battery modules 10 and the air to perform the temperature adjustment of the battery modules 10 efficiently.

Since the protruding portion 16 is connected to the two first ribs adjacent in the Y direction in the present embodiment, the turbulence can be produced in the entire region sandwiched between the two first ribs 15. In other words, the turbulence can be produced in the entire space S. As a result, the entire space S can be used to perform the heat exchange between the battery modules 10 and the air to improve the heat exchange efficiency. In other words, the efficiency of the temperature adjustment of the battery modules 10 can be improved.

In the present embodiment, the protruding portions 16 of the one of the two battery modules 10 adjacent in the X direction are shifted from the protruding portions 16 of the other battery module 10 in the Z direction. This enables the smooth movement of the air in the space S. If the protruding portions 16 of the one battery module 10 are opposite to the protruding portions 16 of the other battery module 10 in the X direction, the air needs to pass between the two protruding portions 16 opposite in the X direction, which obstructs the smooth movement of the air.

Figure 11:
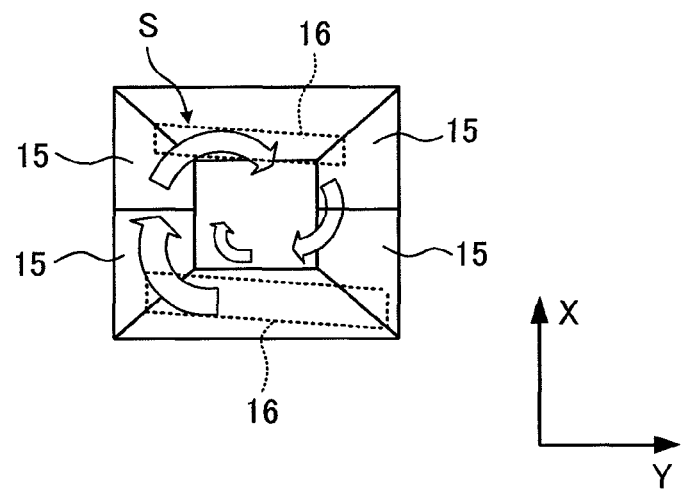
FIG. 11 is a schematic diagram of space in which air moves when viewed from an intake side in Embodiment 1.

In the present embodiment, the protruding portion 16 is inclined with respect to the Z direction. Thus, as shown in FIG. 11, the air entering the space S can be moved along a helical track. FIG. 11 shows the space S when viewed from the intake side. FIG. 11 shows the protruding portions 16 in dotted lines so as to clarify only the position relations between the protruding portions 16. Such a twist produced in the air flow allows the efficient heat exchange between the air and the battery modules 10.

While the first rib 15 extends in the Z direction in the present embodiment, the present invention is not limited thereto. A modification of the present embodiment can employ the first ribs 15 extending in the Y direction. In the modification, the plurality of first ribs 15 are placed in line in the Z direction, and air for temperature adjustment moves in the Y direction (corresponding to the second direction) relative to the battery modules 10. The protruding portion 16 is provided between the two first ribs 15 adjacent in the Z direction as in the present embodiment. The protruding portion 16 has the same configuration as that of the present embodiment except for the inclination direction. In the modification, the inclination angle of the protruding portion 16 relative to a vertical face is preferably 30 degrees or smaller and zero degrees or larger.

While the first rib 15, the protruding portion 16, and the second rib 17 are formed integrally with the outer face of the module case 11 in the present embodiment, the present invention is not limited thereto. Specifically, the outer face of the battery module 10 (module case 11) can be formed of a flat face, and a spacer for forming the space S can be placed between the two battery modules 10 adjacent in the X direction. The spacer can be provided with the first rib 15 and the protruding portion 16 described in the present embodiment. The use of the spacer which is a separate member from the battery module 10 can achieve the similar effects to those of the present embodiment. The spacer can be formed of resin or the like.

Figure 12:
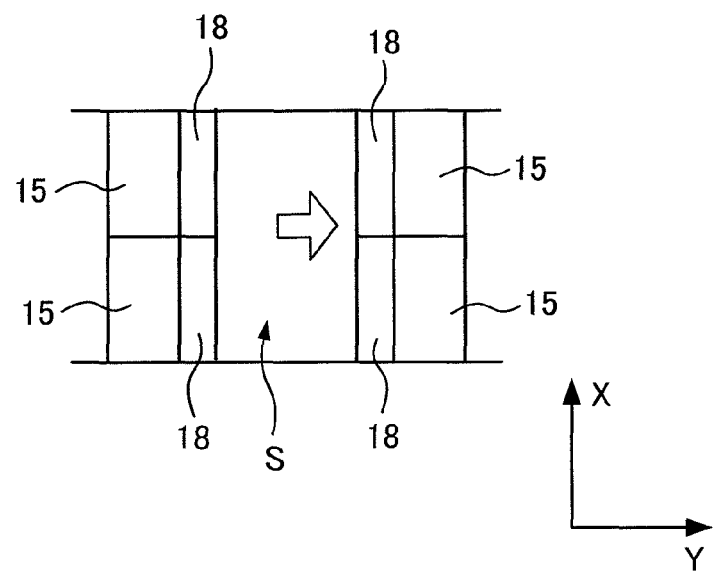
FIG. 12 is a partially enlarged view of a battery pack which is a modification of Embodiment 1.
Figure 13:
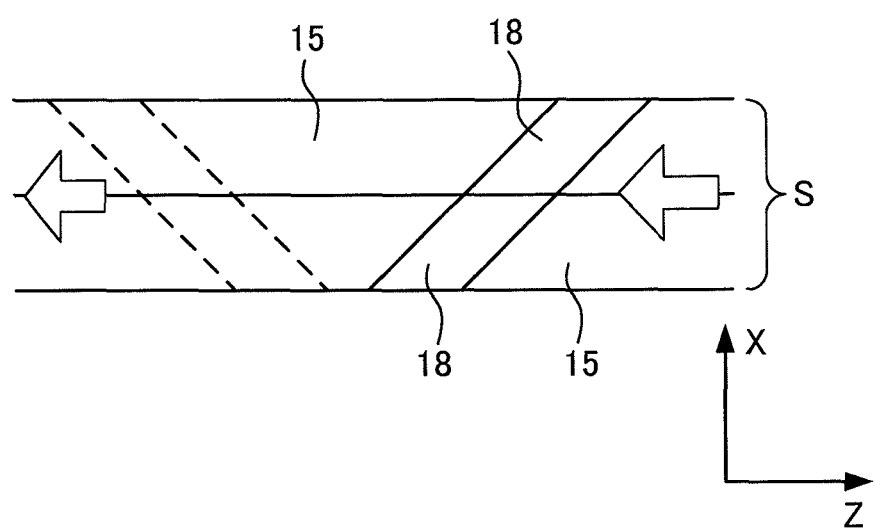
FIG. 13 is a diagram when viewed from a direction indicated by an arrow in FIG. 12.

While the protruding portions 16 are provided on the two faces opposite in the X direction, of the faces forming the space S as shown in FIG. 4 in the present embodiment, the present invention is not limited thereto. Specifically, it is required only that the protruding portions 16 should be provided on the two opposite faces of the faces forming the space S. Specifically, as shown in FIG. 12, protruding portions 18 can be provided on two faces opposite in the Y direction, of faces forming space S. FIG. 12 is a diagram corresponding to FIG. 4. FIG. 13 is a diagram when viewed from a direction indicated by an arrow in FIG. 12.

In the configuration shown in FIG. 12 and FIG. 13, the protruding portion 18 is provided on the side face of the first rib 15 in the Y direction. When the two battery modules 10 are placed in line in the X direction to bring the first ribs 15 provided for the two battery modules 10 into contact with each other, the two protruding portions 18 provided on the two first ribs 15 in contact with each other can form the configuration corresponding to the protruding portions 16 in the present embodiment.

Dotted lines shown in FIG. 13 indicate the protruding portion 18 provided on the first rib 15 opposite to the first rib 15 shown in FIG. 13 in the Y direction. Arrows shown in FIG. 13 indicate the moving direction of air. The configuration shown in FIG. 12 and FIG. 13 can provide the similar effects to those of the present embodiment.

The invention claimed is:

1. An electric storage apparatus comprising:
    a plurality of electric storage units placed in line in a first direction; and
    a spacer forming a space between two adjacent ones of the electric storage units, a heat exchange medium for use in temperature adjustment of the electric storage unit being moved in the space in a second direction orthogonal to the first direction,
    wherein the spacer has a plurality of ribs configured to form the space and has a protruding portion on each of two faces forming the space and opposite to each other, the protruding portion protruding toward the inside of the space and being placed between two adjacent ones of the ribs, and
    the protruding portions provided on the two respective faces are shifted in the second direction from positions where the protruding portions are opposite to each other in the first direction.

2. The electric storage apparatus according to claim 1, wherein the protruding portion is connected to two adjacent ones of the ribs.

3. The electric storage apparatus according to claim 1, wherein the protruding portion is inclined with respect to the second direction.

4. The electric storage apparatus according to claim 3, wherein the protruding portions provided on the two respective faces are inclined in directions in which the protruding portions approach each other when viewed from the first direction.

5. The electric storage apparatus according to claim 1, wherein the electric storage unit has a positive electrode terminal and a negative electrode terminal, and
    the protruding portion provided in a region closer to the positive electrode terminal than a boundary line located at a midpoint between the positive electrode terminal and the negative electrode terminal is shifted in the second direction from the protruding portion provided in a region closer to the negative electrode terminal than the boundary line.

6. The electric storage apparatus according to claim 1, wherein the spacer is formed integrally with an outer face of the electric storage unit.

7. The electric storage apparatus according to claim 1, further comprising:
    a pair of end plates holding the plurality of electric storage units sandwiched in the first direction; and
    a coupling member extending in the first direction and having both ends connected to the pair of end plates.

* * * * *